United States Patent
Wurmfeld

(10) Patent No.: US 11,620,630 B2
(45) Date of Patent: Apr. 4, 2023

(54) SECURE PAYMENT USING A NETWORK OF WEARABLE DEVICES

(71) Applicant: Capital One Services, LLC, McLean, VA (US)

(72) Inventor: David Kelly Wurmfeld, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 295 days.

(21) Appl. No.: 17/118,407

(22) Filed: Dec. 10, 2020

(65) Prior Publication Data

US 2021/0090062 A1     Mar. 25, 2021

Related U.S. Application Data

(63) Continuation of application No. 15/936,532, filed on Mar. 27, 2018, now Pat. No. 10,915,883, which is a
(Continued)

(51) Int. Cl.
*G06Q 20/32*     (2012.01)
*H04B 1/3827*     (2015.01)
(Continued)

(52) U.S. Cl.
CPC ....... *G06Q 20/327* (2013.01); *G06Q 20/3278* (2013.01); *G06Q 20/40145* (2013.01);
(Continued)

(58) Field of Classification Search
CPC .................................................. G06Q 20/327
See application file for complete search history.

(56) References Cited

U.S. PATENT DOCUMENTS

| | | | | |
|---|---|---|---|---|
| 10,467,615 | B1* | 11/2019 | Omojola | G06Q 30/0637 |
| 2013/0332353 | A1* | 12/2013 | Aidasani | G06K 19/0718 |
| | | | | 705/41 |

(Continued)

OTHER PUBLICATIONS

A wearable and ubiquitous NFC wallet IEEE (Year: 2015).*
(Continued)

*Primary Examiner* — Bruce I Ebersman
(74) *Attorney, Agent, or Firm* — Perkins Coie LLP

(57) ABSTRACT

Systems and methods using a network of wearable devices to support secure payment for a user are described. The network of wearable devices may include a wearable secure unit including a first short-range transceiver, a wearable sensory unit including a second short-range transceiver, and a wearable communication unit including a third short-range transceiver and a long-range transceiver. The systems and methods may include receiving a transaction request from a merchant device. Thereafter, the systems and methods may obtain information from the wearable secure unit configured to provide an environment in which processes and data are securely stored and executed. The systems and methods may also obtain information from the wearable sensory unit configured to capture and compare biometrics of the user with a stored profile. Based on the obtained information, the systems and methods may instruct the wearable communication unit to transmit to the merchant device user authentication data.

20 Claims, 7 Drawing Sheets

Related U.S. Application Data continuation of application No. 15/914,227, filed on Mar. 7, 2018, now Pat. No. 10,825,015.

(51) Int. Cl.
  *G06Q 20/40* (2012.01)
  *H02S 99/00* (2014.01)
  *H04B 5/02* (2006.01)
  *H02N 2/18* (2006.01)

(52) U.S. Cl.
  CPC .............. *H04B 1/385* (2013.01); *H02N 2/186* (2013.01); *H02S 99/00* (2013.01); *H04B 5/02* (2013.01); *H04B 2001/3855* (2013.01); *H04B 2001/3866* (2013.01)

(56) References Cited

U.S. PATENT DOCUMENTS

2016/0307189 A1\* 10/2016 Zarakas ................. G06K 19/02
2017/0109730 A1\* 4/2017 Locke .................... G06K 19/02
2018/0268408 A1\* 9/2018 Botros ................. G06Q 20/356

OTHER PUBLICATIONS

Pay-Cloak: A Biometric Back Cover for Smartphones: Facilitating secure contactless payments and identity virtualization at low cost to end users IEEE (Year: 2017).\*

\* cited by examiner

SECURE PAYMENT USING A NETWORK OF WEARABLE DEVICES

CROSS-REFERENCE TO RELATED APPLICATIONS

This application is a continuation of U.S. patent application Ser. No. 15/936,532, filed Mar. 27, 2018, which is a continuation of U.S. patent application Ser. No. 15/914,227, filed Mar. 7, 2018, the contents of which are incorporated herein in its entirety by reference.

TECHNICAL FIELD

The disclosed embodiments generally relate to systems and methods for enabling secure payment, and more particularly, to using a network of wearable devices for executing secure payment.

BACKGROUND

Many forms of mobile payments are available to consumers today. While traditional methods such as cash and credit cards remain popular, many consumers also use new forms of payment made available via electronic computing devices. Payment terminals can obtain payment account information from certain wearable device and then communicate with an appropriate financial network or other back-end processing system to authorize the transaction. In one example, payment tokens are used to secure data processed by wearable devices equipped with near-field communication ("NFC") capability when conducting payment transactions between contactless payment cards and contactless payment terminals.

The ability to request and receive payment tokens for mobile payment transactions and to authorize the transactions, requires network connectivity beyond NFC technology. Therefore, existing wearable devices that employ NFC technology for payment typically use additional Bluetooth® or similar wireless technology to request and receive the payment tokens. In addition, some wearable devices that are being used for payment may include one or more biometric sensors to authenticate the identity of the user. Inevitably, cramming all of this hardware into a single wearable device results in a bulky wearable device.

Thus, certain aspects of the disclosed embodiments provide methods and systems that address shortcomings of current technology for providing secure payment using wearable devices.

SUMMARY

The disclosed embodiments address disadvantages of existing systems by providing novel systems, methods, and techniques for secure payment using a network of wearable devices.

Consistent with certain disclosed embodiments, a wearable system is provided for supporting secure payment by a user. The wearable system may include a plurality of short-range transceivers, wherein each of the plurality of short-range transceivers is configured to relay information to at least one other short-range transceiver. The plurality of short-range transceivers include at least a first short-range transceiver, a second short-range transceiver, and a third short-range transceiver. The wearable system may also include a wearable secure unit configured to provide an environment in which processes and data are securely stored and executed, the secure unit including a first power source and the first short-range transceiver. The wearable system further may include a wearable sensory unit configured to capture and compare biometrics of the user with a stored profile, the sensory unit including a second power source and the second short-range transceiver. The wearable system may also include a wearable communication unit configured to communicate with a merchant device, the communication unit including a third power source, a long-range transceiver, and the third short-range transceiver. Additionally, the wearable system may include at least one processor configured to: receive a transaction request from the merchant device; obtain information from the wearable secure unit and from the wearable sensory unit; and instruct the wearable communication unit to transmit to the merchant device user authentication data Consistent with other disclosed embodiments, a method is provided for using a network of wearable devices to support secure payment for a user. The method may include receiving a transaction request from a merchant device. The method also include obtaining information from a wearable secure unit including a first short-range transceiver and configured to provide an environment in which processes and data are securely stored and executed. The method may further include obtaining information from a wearable sensory unit including a second short-range transceiver and configured to capture and compare biometrics of the user with a stored profile. Additionally, the method may include instructing a wearable communication unit including a third short-range transceiver and a long-range transceiver to transmit to the merchant device user authentication data.

Aspects of the disclosed embodiments may also include a non-transitory tangible computer-readable medium that stores software instructions that, when executed by one or more processors, are configured for and capable of performing and executing one or more of the methods, operations, and the like consistent with the disclosed embodiments.

It is to be understood that the foregoing description and the accompanying drawings are exemplary and explanatory only, and are not restrictive of the disclosed embodiments as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or similar parts.

The disclosed embodiments are directed to systems and methods for supporting secure payment by a user. In particular, the disclosed systems and methods include distributing the functions required to perform a secure payment between multiple wearable devices configured to communicate with each other. As an example, multiple wearable devices may be "smart" devices, that is, devices that have processors and are capable of receiving and processing data and wirelessly communicate with other smart devices.

The disclosed embodiments may involve a scenario where a user includes a smart cufflink configured to communicate with a merchant device, a smartwatch configured to capture and compare biometrics of the user with a stored profile, and a smart earring including a secure element that provide an environment in which processes and data are securely stored and executed. The smart cufflink, the smartwatch, and the smart earring may form a personal mesh network for communicating with each other. In this example scenario no smartphone or digital wallet is needed, since the smart cufflink serves as main a hub of a personal mesh network that has all the required elements for completing a secure transaction. Accordingly, when the user wants to purchase a product, the smart cufflink may receive a transaction request from a merchant device; obtain information (such as, for example, payment token and authentication data) from the smart-earring and from the smartwatch; determine, based on the obtained information, that the transaction request is approved; and transmit to the merchant device user authentication data.

Figure 1:
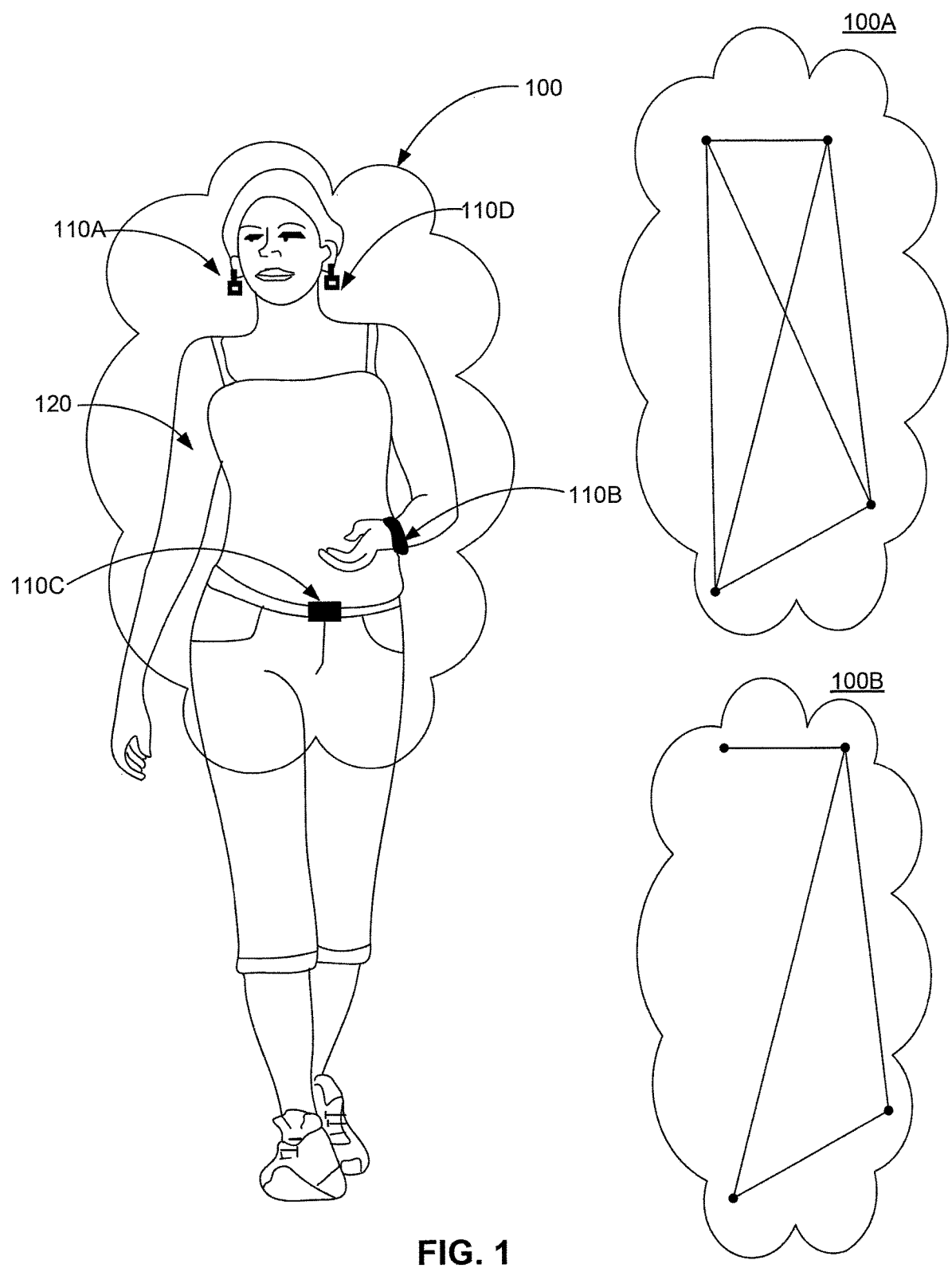
FIG. 1 is a schematic illustration of a user wearing a plurality of wearable devices consistent with a disclosed embodiment.

FIG. 1 illustrates a user 120 associated with a plurality of wearable devices 110A-110D configured to form a wireless personal network 100, consistent with the disclosed embodiments. The term "wearable device" includes any device configured to be worn or carried by a user, such as a user 120. For example, a wearable device may be incorporated into a wearable item such as a wristband, jewelry, eyeglasses, sunglasses, watch, or piece of clothing (e.g., shirt, shoe, pants, jacket, etc.). In addition, a wearable device may include an attachment device (e.g., a clip) to allow it to be attached to a wearable item (e.g., belt), or be incorporated into an item that is normally carried by a user or held in the user's pocket (e.g., smartphone, wallet, keys), and the like. In some embodiments, a wearable device may be a component of or incorporated into a commercially available wearable computing device, such as a smartwatch.

In the example illustrated in FIG. 1, user 120 wears a pair of smart earrings (e.g., wearable devices 110A and 110D), a smartwatch (e.g., a wearable device 110B), and a smart belt buckle (e.g., a wearable device 110C). In some embodiments, at least one wearable device 110 may be an active device having an internal power supply capable of operating all aspects of wearable device 110. In other embodiments, at least one wearable device 110 may be a semi-passive device having an internal power supply for operating circuitry of wearable device 110 but drawing power from, for example, an apparatus configured to harvest energy from movement of the user or from a one solar cell. In still other embodiments, at least one wearable device 110 may be a passive device having no internal power supply. For example, a wearable device may be configured to draw power to operate from, for example, an NFC reader associated with a merchant device.

Figure 2:
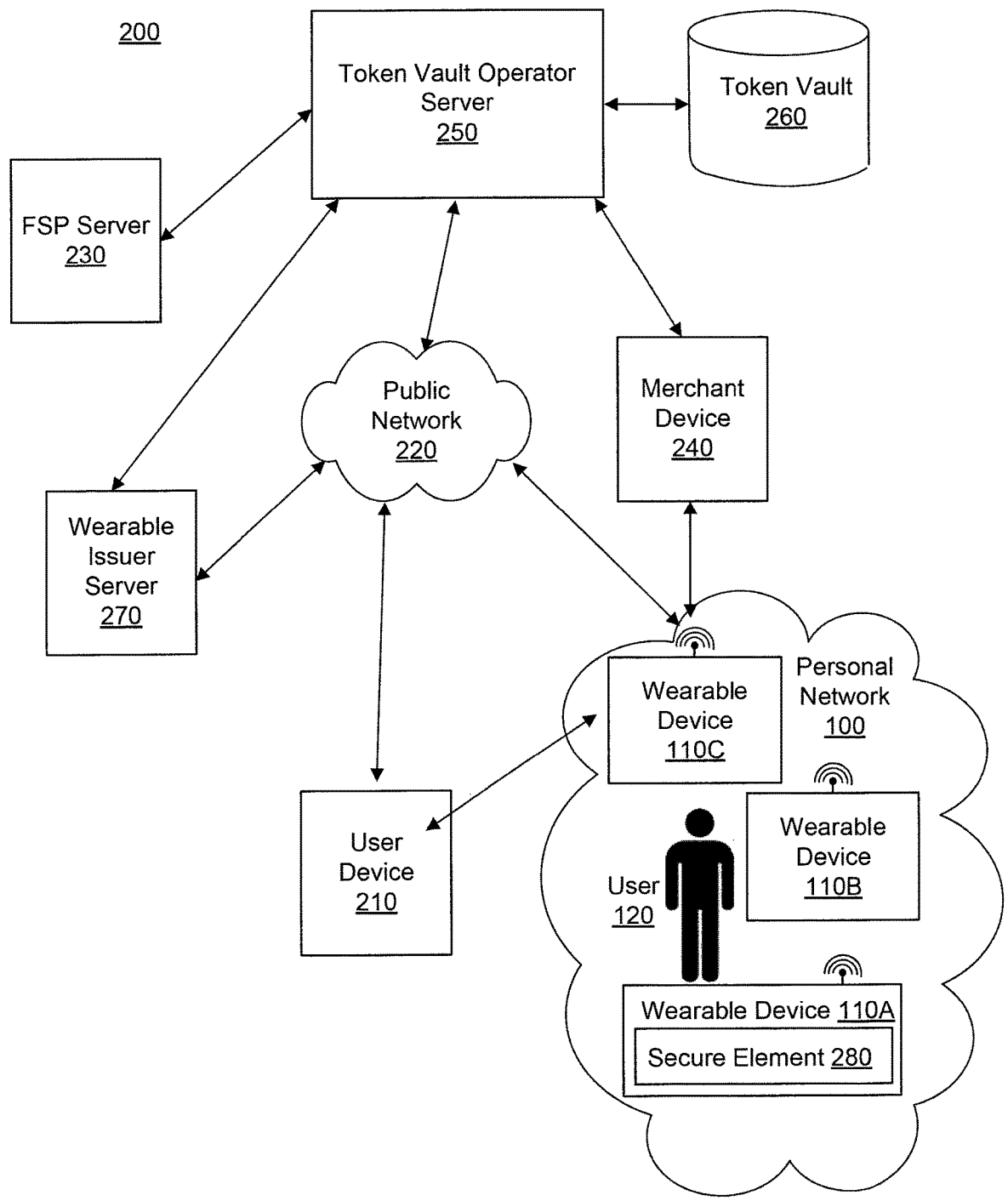
FIG. 2 is a block diagram of an exemplary system, consistent with disclosed embodiments.

Consistent with the present disclosure, wearable devices 110A-110D form a personal network 100 that may be used to support secure payment by a user 120 by communicating with one or more components of a system for performing secure payment transactions (depicted in FIG. 2). For example, personal network 100 may be configured to store information (e.g., one or more tokens) that may be transmitted to a merchant device for use in processing a transaction. In this context, a "token" is a secure software mechanism that may be used to authorize operations, and may be used to conduct secure payment transactions.

In one embodiment, personal network 100 may be a mesh network that includes a wearable secure unit (e.g., wearable device 110A), a wearable sensory unit (e.g., wearable device 110B), and a wearable communication unit (e.g., wearable device 110C). A mesh network is a communications network that permits paths for information to flow between any node. In the present disclosure, wearable devices 110 may be considered as nodes in personal network 100. In a mesh network, data can be routed between nodes so that continuous connections and reconfiguration around broken paths can be made by "hopping" from node to node until the destination is reached. Mesh networks may be referred to as self-healing, because the network can still operate even when a node breaks down or a connection goes bad. Therefore, mesh networks are considered to be very reliable.

FIG. 1 illustrates two example configurations of personal network 100 where the functions required to perform a secure payment are distributed between wearable devices 110 forming personal network 100. Personal network 100A is an example of full mesh network where each wearable device 110 is connected to every other wearable device 110 in the network, and personal network 100B is an example of a partial mesh network where at least one wearable device 110 is not connected to every other wearable device 110. In other configurations, personal network 100 may have a topology similar to conventional star/tree local network topologies in which nodes are directly linked to only a small subset of other nodes.

FIG. 2 is a block diagram of an exemplary system 200 for performing secure payment transactions, consistent with disclosed embodiments. In one embodiment, system 200 may include personal network 100, one or more user devices 210, a public network 220, one or more financial service provider (FSP) servers 230, one or more merchant devices 240, one or more token vault operator servers 250, one or more token vaults 260, and one or more wearable issuer servers 270. Consistent with disclosed embodiments, user 120 may be associated with one or more user devices 210 and with a plurality of wearable devices 110A, 110B, and 110C. In some cases, user device 210 may be configured to communicate with, or be part of, personal network 100. A person skilled in the art can appreciate that the components and arrangement of the components included in system 200 may vary. Thus, system 200 may include other components that perform or assist in the performance of one or more processes consistent with the disclosed embodiments.

In one embodiment, the components of system 200 may be computing systems configured to enable the use of tokens to conduct secure payment transactions. System 200 may as well be configured to enable reprovision of payment tokens, on wearable devices without Bluetooth® or other network connectivity beyond NFC radio. As further described herein, components of system 200 may include computing devices (e.g., computers, servers, etc.), memory storing data and/or software instructions (e.g., databases, memory devices, etc.), and other known computing components. In some embodiments, the computing devices may be configured to execute software instructions stored on memory devices to perform operations consistent with the disclosed embodiments. In another embodiment, components of system 200 may be configured to communicate with one or more other components of system 200, including wearable device 110C, user device 210, FSP server 230, merchant device 240, token vault operator server 250, or token vault 260, or wearable issuer server 270. In certain aspects, user 120 may operate one or more components of system 200 to initiate and provide input for operations consistent with the disclosed embodiments.

As mentioned above, in addition to the plurality of wearable devices 110, user 120 may be associated with user device 210. The term "user device" refers to a device including a processing unit and having computing capabilities and may include one or more processors configured to execute software instructions stored in memory. Some examples of user device 210 include a PC, a laptop, a tablet, and a smartphone.

User device 210 may include software that when executed by a processor performs known Internet-related communication, content display processes, and/or disclosed token vault processes for a user. For instance, user device 210 may execute browser or related mobile display software that generates and displays interfaces including content on a display device included in, or associated with user device 210. User device 210 may be a mobile device that executes mobile device applications and/or mobile device communication software that allows user device 210 to communicate with components over public network 220, and generates and displays content in interfaces via a display device included in user device 210.

In one embodiment, user device 210 may communicate directly with wearable device 110C and/or with any components of system 200 over public network 220. The communication between user device 210 and wearable device 110C may be using any known wireless standard (e.g., Wi-Fi, Bluetooth®, etc.), as well as near-field capacitive coupling, and other short range wireless techniques, or via a wired connection.

In another embodiment, user device 210 may be a member of personal network 100; for example, user device 210 may be configured to function as wearable device 110C. Specifically, similarly to wearable device 110C, user device 210 may communicate with other members of personal network 100 and execute applications that provide token vault functions offered by token vault operator server 250 and/or financial service-related functions offered by FSP server 230.

The components of system 200 may communicate with each other via a public network. The term "public network" (in contrast to personal network 100) refers to a communication network that connects two or more entities located remotely from each other. In one embodiment, public network 220 may be any type of network configured to provide communications between components of system 200. For example, public network 220 may be any type of network (including infrastructure) that provides communications, exchanges information, and/or facilitates the exchange of information, such as the Internet, a Local Area Network, wireless network (e.g., a Wi-Fi/302.11 network), or other suitable connections that enables the sending and receiving of information between the components of system 200. In other embodiments, one or more components of system 200 may communicate directly through dedicated communication links (shown and not shown), such as, for example, a telephone network, an extranet, an intranet, the Internet, satellite communications, off-line communications, wireless communications, transponder communications, a local area network (LAN), a wide area network (WAN), and a virtual private network (VPN).

Consistent with the present disclosure, system 200 may include FSP server 230 associated with a financial service provider. The term "financial service provider" may include an entity that provides, maintains, manages, or otherwise offers financial services. For example, financial service provider may be a bank, credit card issuer, or any other type of financial service entity that generates, provides, manages, and/or maintains financial service accounts for account holders. Financial service accounts may include, for example, credit card accounts, loan accounts, checking accounts, savings accounts, reward or loyalty program accounts, and/or any other type of financial service account known to those skilled in the art. Financial service providers include infrastructure and components that are configured to generate and/or provide financial service accounts such as credit card accounts, checking accounts, debit card accounts, loyalty or reward programs, lines of credit, or the like. In one embodiment, FSP server 230 may include at least one processor configured to perform the operations consistent with disclosed embodiments. The processor may be configured to execute software instructions that, when executed, perform known Internet-related communication and financial service-based processes. For example, FSP server 230 may be a desktop computer, a server, or any other type of computing device.

Consistent with the present disclosure, system 200 may include one or more merchant devices 240 associated with a merchant (not shown). The term "merchant" may refer to any entity that offers for sale goods, services, and/or information, such as a retailer (e.g., Macy's®, Target®, etc.), grocery store, service provider (e.g., utility company, etc.), or any other type of entity that offers goods, services, and/or information that consumers (e.g., end-users or other business entities) may purchase, consume, use, etc. In one example, a merchant may be associated with a merchant brick-and-mortar location that a user (e.g., user 120) may physically visit and purchase a product or service. The merchant may also include back-end and/or front-end computing components that store data and execute software instructions to perform operations consistent with disclosed embodiments, such as computers that are operated by employees of the merchant (e.g., back office systems, etc.). In one embodiment, merchant device 240 may include one or more computing systems, such as servers, desktop computers, point-of-sale devices, etc., that are configured to execute stored software instructions to perform operations associated with a merchant consistent with the disclosed embodiments. For example, merchant device 240 may execute processes associated with processing purchase transactions, generating transaction data, generating product data (e.g., SKU data) relating to purchase transactions, etc.

The disclosed embodiments are not limited to any particular configuration of merchant device 240. In a first embodiment, merchant device 240 may be a point-of-sale system like a cash register. Merchant device 240 may comprise functionality and/or hardware operable to receive wireless communications from wearable device 110C and/or user device 210. For example, merchant device 240 may be utilize technologies such as near field communication (NFC) radio, RFID, infrared, electric field, magnetic fields, or other technologies, in order to initiate and/or process a purchase or other transaction. In a second embodiment, merchant device 240 may include a contactless payment terminal (not shown) comprising any known NFC device designed to communicate (directly or indirectly) with other components of system 200. For example, the contactless payment terminal (CPT) may be a point of sale (POS) terminal, automated teller machine (ATM), or any other device that is configured to communicate with a wearable device 110 and/or user device 210 to facilitate a financial transaction according to disclosed embodiments.

Consistent with the present disclosure, FSP server 230 and merchant device 240 may communicate with token vault operator server 250. In one embodiment, token vault operator server 250 may be operated by VISA®, MasterCard®, or any other entity controlling a payment process capable of facilitating a transaction from FSP server 230 for an account of user 120 to a merchant associated with merchant device 240. Token vault operator server 250 may execute software that provides data used for generating and displaying interfaces, including content on a display device included in, or connected to, user device 210, a POS associated with merchant device 240, etc. In some embodiments, token vault operator server 250 may provide one or more web sites, online portals, APIs, etc. that are accessible by user device 210, FSP server 230, wearable issuer server 270, and/or merchant device 240. The disclosed embodiments are not limited to any particular configuration of token vault operator server 250.

In another embodiment, token vault operator server 250 may be one or more devices associated with an entity (not shown) that monitors and/or controls access to token vault 260. Token vault 260 may include one or more memory devices that store information and are accessed and/or managed through token vault operator server 250. By way of example, token vault 260 may include Oracle™ databases, Sybase™ databases, or other relational databases or non-relational databases, such as Hadoop sequence files, HBase, or Cassandra. The databases or other files may include, for example, data and information related to generated tokens, token relationships to financial accounts of user 120, financial records, purchase transaction data, etc. Systems and methods of disclosed embodiments, however, are not limited to separate databases. In one aspect, token vault operator server 250 may include token vault 260. Alternatively, token vault 260 may be located remotely from the token vault operator server 250. Token vault 260 may include computing components (e.g., database management system, database server, etc.) configured to receive and process requests for data stored in memory devices of token vault 260 and to provide data from token vault 260.

Wearable issuer server 270 may be one or more devices associated with an entity (not shown) that manufactures, sells, promotes, or otherwise provides wearable devices, such as wearable devices 110. In some embodiments, wearable issuer server 270 may communicate with user device 210, FSP server 230, and/or token vault operator server 250 to, for example, associate one or more financial accounts of user 120 in token vault 260 with one or more tokens stored in a secure element 280 of wearable device 110A. The term "secure element" is well known to those who are skilled in the art, and typically refers to a device that may include a small processor and volatile and/or nonvolatile memory that is secured from tampering and reprogramming by suitable measures.

Figure 3:
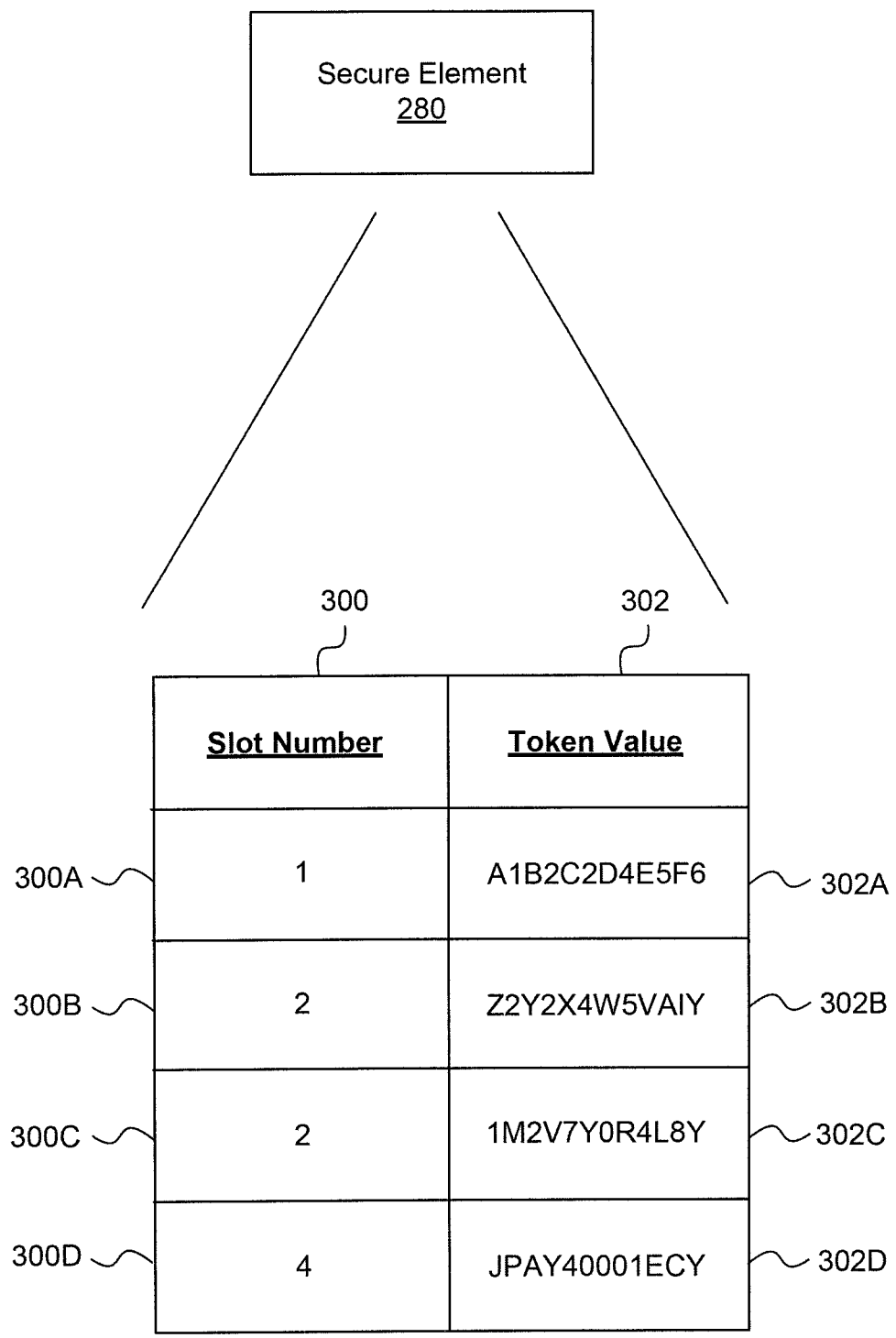
FIG. 3 is a diagram of an exemplary secure element included in a wearable device, consistent with disclosed embodiments.

FIG. 3 is a diagram illustrating an example of secure element 280. Consistent with the present disclosure, secure element 280 may be associated with a memory configured to store one or more token slots 300 and token values 302. For example, secure element 280 may comprise four slots 300A-D corresponding to four token values 302A-D. According to some embodiments, each token value 302A-D may correspond to a different financial account of user 120 held with the financial service provider associated with FSP server 230. In other embodiments, one or more token values 302A-D may correspond to the same financial account of user 120 held with the financial service provider associated with FSP server 230.

As discussed in more detail below, upon receiving a transaction request originating from merchant device 240, wearable device 110A may identify a slot 300A-D and transmit a corresponding token value 302A-D to wearable device 110C. Thereafter, wearable device 110C may transmit to merchant device 240 user authentication data. The authentication data may include a token that enable the underlying merchant to obtain details of a financial account associated with the token. In some embodiments, personal network 100 of wearable device 110 may be preprogrammed with an active slot to use when receiving the transaction request from merchant device 240. In other embodiments, wearable device 110A may identify a slot 300 dynamically based on, for example, a rotating basis or a command from another system 200 component (e.g., merchant device 240, FSP server 230, token vault operator server 250, etc.).

Figure 4:
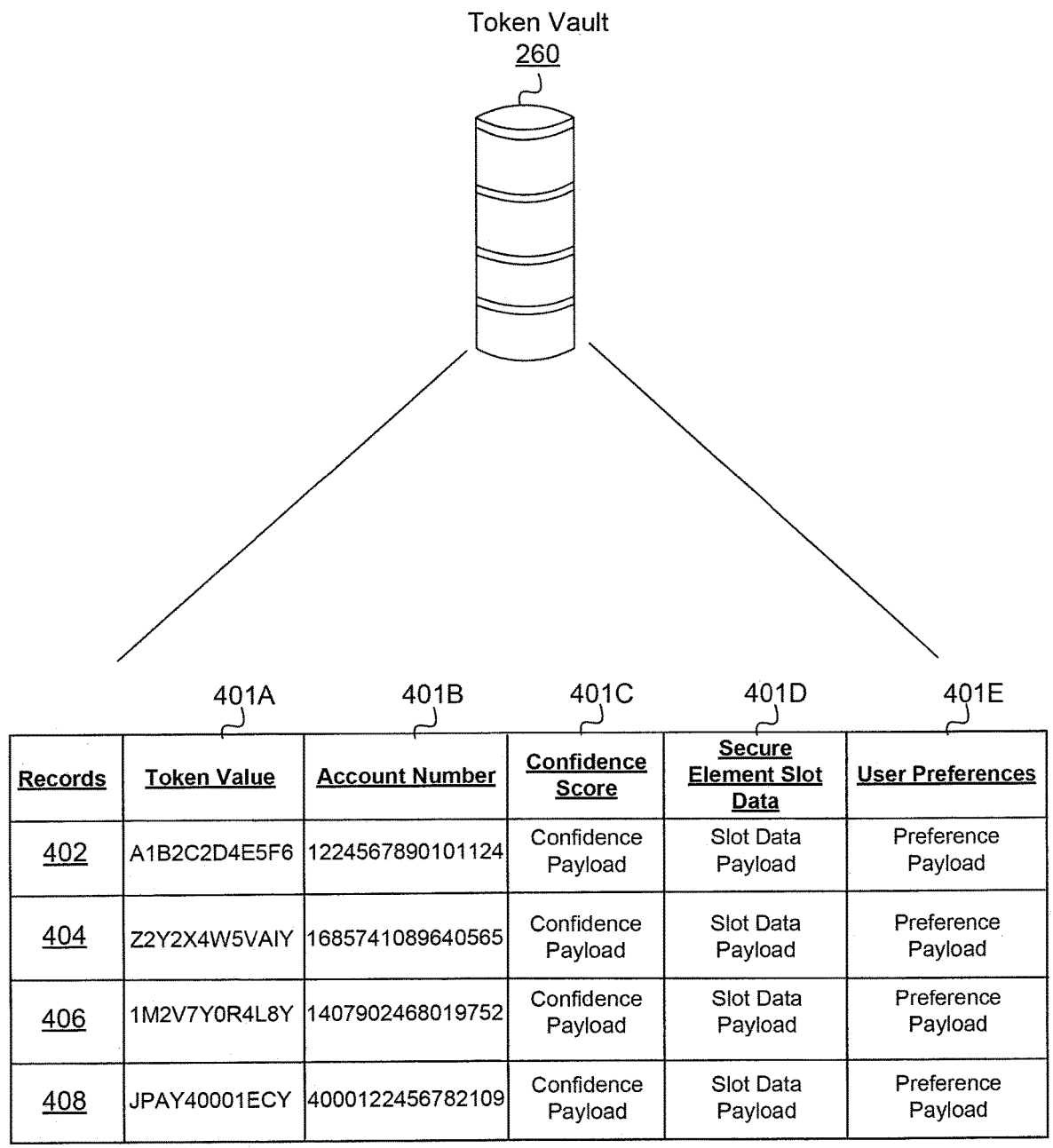
FIG. 4 is a diagram of an exemplary data structure for storing data in a token vault, consistent with disclosed embodiments.

FIG. 4 is a diagram of exemplary information stored in token vault 260, consistent with disclosed embodiments. In one embodiment, token vault 260 stores a table that contains records 402, 404, 406, and 408. Each of record contains one or more fields 401 (e.g., 401A, 401B, 401C, 401D, and 401E). The fields, records, and values therein in FIG. 4 are exemplary and are provided to illustrate embodiments of the disclosure.

As shown, each record may contain field 401A, entitled for exemplary purposes as "Token Value." Field 401A may contain a unique token value. Token values may be generated, for example, by wearable issuer server 270, token vault operator server 250, or other components of system 200. For example, wearable issuer server 270 may generate one or more token values and store the token values in the secure element 280 when constructing wearable device 110A. Wearable issuer server 270 may transmit the generated tokens to token vault 260 (via, e.g., token vault operator server 250), which may be inserted into token vault 260 as an entry under field 401A.

Records may also contain a field 401B, entitled for exemplary purposes as "Account Number." Field 401B may contain an account number associated with a financial account of a user (e.g., user 120) issued by a financial service provider (e.g., associated with FSP server 230). For example, consistent with disclosed embodiments, user 120 may purchase wearable device 110A from an issuer of wearable devices and use wearable device 110C (or user device 210) to link with a financial account of user 120 with one or more tokens stored in secure element 280 of the wearable device 110. In response, token vault 260 may associate the identified token (which are stored under field 401A) with the financial account of user 120 by inserting the financial account number in a corresponding field 401B.

Records may also contain a field 401C, entitled for exemplary purposes as "Confidence Score." Field 401C may contain a representation of the estimated likelihood that the personal network 100 of wearable devices 110, secure element 280, a token, or a financial account associated with a given records 402-408 has become compromised. In one embodiment, token vault 260 may insert a confidence score in field 401C that may result in the denial of requests for financial account numbers in fields 401B using token values associated with a certain wearable device 110. In one example, user 120 may report that one of the wearable devices 110 of personal network 100 was stolen. In another example, wearable device 110C may report that one member of personal network 100 (e.g., wearable device 110B) has lost connectivity. In some embodiments, transactions associated with account numbers in fields 401B may be monitored for fraudulent activity by one or more components of system 200, and token vault 260 may update the confidence score indicated in field 401C based on monitored activities. Thus, in some embodiments, token vault 260 may deny requests for financial account numbers in fields 401Busing token values associated with confidence scores that have fallen below a threshold.

Records may also contain a field 401D, entitled for exemplary purposes as "Secure Element Slot Data." Field 401D may contain data associated with the slots of secure element 280. For example, field 401D may indicate the slot of secure element 280 in which tokens indicated in field 401A are stored in secure element 280 (e.g., one or more of slots 300A-D of FIG. 3). In some embodiments, only one slot 300 of secure element 280 may be active at a time (e.g., token vault 260 will only provide an account number associated with secure element 280 when the requesting party—e.g., merchant device 240—requests the account using the token stored in an active slot). Thus, field 401D may store data indicating, among other things, the number of slots available on a given secure element 280, as well as the active slot. In some embodiments, the active slot may rotate through available slots such that the active slot of a secure element 280 is predictable to both token vault 260 and secure element 280, but not unauthorized parties. In other embodiments, token vault 260 may indicate to secure element 280 (via, e.g., an NFC device at merchant device 240) which slot is active before providing a token to merchant device 240 as part of a purchase transaction with user 120.

Records may also contain a field 401E, entitled for exemplary purposes as "User Preferences." Field 401E may contain account token vault preferences of a user (e.g., user 120). For example, in some embodiments, user preferences may indicate which account from among a plurality of accounts to use based on set of predefined circumstances. For example, multiple financial accounts may be associated with a token, and the user preferences in field 401E may instruct token vault operator server 250 to return a first financial account for purchases made for a first merchant, a second financial account for transactions exceeding a predetermine amount, etc. Moreover, the user preferences may indicate that token vault operator server 250 should return the account number associated with the financial account that would provide a purchase discount, maximize rewards associated with a loyalty program, etc.

In other embodiments, when each financial account is associated with a separate token, token vault operator server 250 may request the token value associated with the preferred account according to user preferences when presented with a request for a financial account number. The user preferences in field 401E may further indicate that token vault operator server 250 should prompt merchant device 240 (e.g., a POS terminal) to request a PIN, biometrics, etc. for transactions with lower confidence score in field 401C (e.g., due to a higher risk associated with an new merchant, uncharacteristically high transaction amount, etc.). Token vault 260 may associate the identified token (which are stored under field 401A) with the user preferences by inserting the user preferences in a corresponding field 401E.

One of ordinary skill will understand that token vault 260 may contain other fields and/or additional types of data. For example, token vault 260 may contain information such as security codes (e.g., CW, CVV2) associated with account numbers in fields 401B, may contain expiration dates associated with account numbers in fields 401B, may contain names on payment cards associated with account numbers in fields 401B, etc. Moreover, while FIG. 2 depicts a single token vault 260, one of ordinary skill will understand that a plurality of token vaults 260 may be employed operated by the same and/or different components of system 200 may be possible.

Consistent with the present disclosure, system 200 illustrated in FIG. 2 and FIG. 3-2B may complete a process of secure payment for services or goods rendered. In one embodiment, the process starts when merchant device 240 transmits a transaction request to wearable device 110C. After an internal process in personal network 100 (e.g., as described in FIG. 6 or FIG. 7), merchant device 240 may receive a token from wearable device 110C as part of a payment transaction for services and/or good rendered. Merchant device 240 may then send the token (along with other information) to token vault operator server 250 and/or token vault 260 requesting financial account information associated with the token with which to complete a payment transaction. Thereafter, merchant device 240 may also generate and send transaction requests to systems, such as FSP server 230. Such transaction requests may comply with ISO 4083. For example, upon receiving financial account information associated with the token, merchant device 240 may generate an ISO 4083 message to FSP server 230 indicating that an account holder would like to make a debit transaction for the purchase price of the rendered good or service.

It is to be understood that the configuration and boundaries of the functional building blocks of system 200 illustrated in FIG. 2 have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art based on the teachings contained herein. For example, wearable devices 110, user device 210, FSP server 230, token vault operator server 250, token vault 260 and/or wearable issuer server 270 may constitute a part of components of system 200 other than those specifically described, or may constitute a part of multiple components of system 200 (i.e., a distributed system). Moreover, token vault operator server 250 and token vault 260 may be separated and distinct from other components of system 200 (as shown), or token vault operator server 250 and token vault 260 may be may be part another component of system 200, such as FSP server 230.

Figure 5:
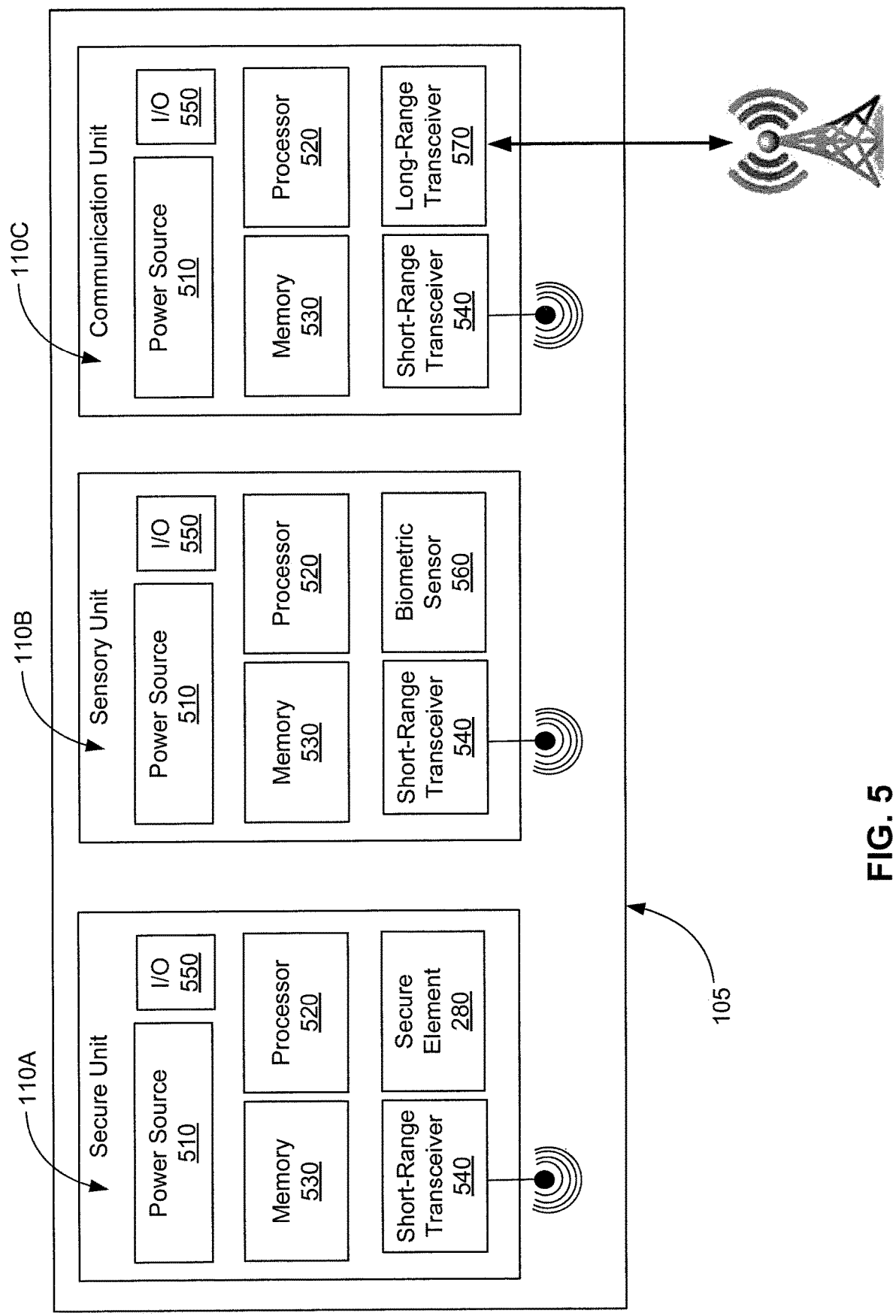
FIG. 5 is a diagram of three exemplary wearable devices, consistent with disclosed embodiments

FIG. 5 depicts exemplary configurations of wearable device 110A, wearable device 110B, and wearable device 110C, consistent with disclosed embodiments. In one embodiment, wearable device 110 may include components that may execute a process to initiate a financial transaction by, for example, transmitting a token associated with a financial account to merchant device 240. As shown in FIG. 5, each wearable device 110 may include a separated power source 510, processor 520, a memory device 530, a short-range transceiver 540, and I/O devices 550. In addition, wearable device 110A may include a secure element 280, wearable device 110B may include a biometric sensor 560, and wearable device 110C may include a long-range transceiver 570. As will be appreciated by a person skilled in the art having the benefit of this disclosure, numerous variations and/or modifications may be made to exemplary configurations. Not all components are essential for the operation of each wearable device 110. Any component may be located in any appropriate wearable device and the components may be rearranged into a variety of configurations while providing the functionality of the disclosed embodiments. For example, in some embodiments, wearable device 110B may not include and I/O devices 550. Therefore, the foregoing configurations are examples and, regardless of the configurations discussed below, together plurality of wearable devices 110 can execute a process to initiate a financial transaction.

As shown in FIG. 5, each wearable device 110 may include power source 510.

Specifically, wearable device 110A may include a first power source, wearable device 110B may include a second power source, and wearable device 110C may include a third power source. In one embodiment, the third power source is configured to provide more electric power than the first power source. In another embodiment the third power source is configured to provide more electric power than both the first power source and the second power source combined. The term "power source" includes any device capable of providing electrical power, which can be easily incorporated into a wearable device (e.g., power source 510 may weigh less than a 300 g, less than 200 g, less than 50 g, or less than 5 g). The size of the power source enables user 120 to use wearable device 110 in a variety of situations. In some embodiments, power source 510 may be rechargeable and contained within a casing of wearable device 110. In other embodiments, power source 510 may include one or more energy harvesting devices for converting ambient energy into electrical energy (e.g., portable solar power units, human vibration units, etc.). Specially, power source 510 may include an apparatus configured to harvest energy from movement of user 120 for powering a corresponding wearable unit. Alternatively, power source 510 may include a solar cell configured to harvest energy from ambient light for powering a corresponding wearable unit. In some embodiments, power source 510 may include one or more storage devices, such as batteries (e.g., Zinc-air batteries, Alkaline batteries, Mercuric-oxide batteries, Silver-oxide batteries, nickel-cadmium batteries, nickel-metal hydride batteries, and lithium-ion batteries) or capacitors, for storing harvested energy or any other type energy.

Processor 520, depicted in FIG. 5, may include any suitable processing device. The term "processing device" includes any physical device having an electric circuit that performs a logic operation on input or inputs. For example, a processing device may include one or more integrated circuits, microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by the processing device may, for example, be pre-loaded into a memory integrated with or embedded into the processing device or may be stored in a separate memory (e.g., memory device 530). Although, in the embodiment illustrated in FIG. 5, each wearable device 110 includes one processing device (e.g., processor 520), each wearable device 110 may include more than one processing device. Each processing device may have a similar construction, or the processing devices may be of differing constructions that are electrically connected or disconnected from each other. For example, the processing devices may be separate circuits or integrated in a single circuit. When more than one processing device is used, the processing devices may be configured to operate independently or collaboratively. The processing devices may be coupled electrically, magnetically, optically, acoustically, mechanically or by other means that permit them to interact. Examples of processor 520 varies from microcontrollers configured to process simple logic commands, such as PIC microcontrollers, MIPS microcontrollers, etc., to more powerful microprocessors including the Pentium™ or Xeon™ family manufactured by Intel™, the Turion™ family manufactured by AMO™, or any of various processors manufactured by Sun Microsystems. The disclosed embodiments are not limited to any type of processing device.

Consistent with the present disclosure, memory device 530 may include one or more storage devices configured to store information. For example, in some embodiments, memory device 530 may store instructions that may be executed by a processor, such as processor 520. Memory device 530 may store data that may reflect any type of information in any format that the system may use to perform operations consistent with the disclosed embodiments. In one embodiment each wearable device 110 may be associated with a separate memory device that differs by memory size. For example, memory device 530 may comprise a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, processor 520 may execute one or more programs stored by memory device 530. For example, processor 520 may execute a transaction program configured to provide a token stored in secure unit (e.g., wearable device 110A) to a merchant device (e.g., a POS device) when user 120 operates the personal network 100 of wearable devices 110 to complete a financial transaction.

In one embodiment, each wearable device 110 which is a member of personal network 100 may include short-range transceiver 540. Specifically, wearable device 110A may include a first short-range transceiver, wearable device 110B may include a second short-range transceiver, and wearable device 110C may include a third short-range transceiver. Each of the first, second, and third short-range transceivers is configured to relay information to at least one other short-range transceiver included in personal network 100. The term "short-range transceiver" refers to any device configured to exchange transmissions over an air interface by use of radio frequency, infrared frequency, magnetic field, or electric field. Short-range transceiver 540 may use any known standard to transmit and/or receive data in a transmission range lower than 10 meters (e.g., Bluetooth®, Bluetooth Smart, or ZigBee). Consistent with the present disclosure, each of the short-range transceivers respectively has a transmission range lower than 5 meters, lower than 2 meter, and lower than 1 meter. Accordingly, personal network 100 may have a coverage lower than 8 meters, lower than 6 meters, or lower than 4 meters. In one example, at least one of the plurality of short-range transceivers includes a near field communication (NFC) transceiver with a transmission range of few centimeters. In one embodiment, each of the plurality of short-range transceivers has a transmission power of between 0 dBm and 32 dBm. In another embodiment, each of the plurality of short-range transceivers supports data rates from 700 bits/s to 700 kbits/s.

I/O devices 550 may also include one or more digital and/or analog devices that allow user 120 to interact with wearable device 110, such as a touch-sensitive display, buttons, or microphones. I/O devices 550 may also include other components known in the art for interacting with user 120, such as optical, magnetic, vibration, or other sensors capable of detecting interaction with wearable device 110 by user 120. In one embodiment, I/O devices 550 may include a display configured to convey information to user 120. For example, the display may be a screen display, one or more LED lights, etc. In some embodiments, I/O devices 550 may be configured to displaying optical payment methods or providing information to user 120.

Consistent with the present disclosure, wearable device 110A may include secure element 280 having a memory associated with a plurality of slots for providing an environment in which processes and data may be securely stored and/or executed. In one embodiment, secure element 280 may be a software module located in memory device 530 and may use memory device 530 for storing user authentication data. In another embodiment, secure element 280 may use a memory separated from wearable device 110A, such as a SIM/UICC card, to store the user authentication data. In certain embodiments, secure element 280 may be configured and operate as known secure elements for wearable devices. Specifically, after receiving a transaction request, processor 520 may identify a token stored in an active slot of the secure element; and instruct the wearable device 110C to transmit the user authentication data that includes the stored token. In some examples, secure element 280 may store applications, slot information, credentials (e.g., tokens), and/or other information associated with secure execution of applications.

Consistent with the present disclosure, wearable device 110B may include biometric sensor 560 configured to capture and compare biometrics of the user with a stored profile. The term "biometric sensor" includes any sensor that provides data representative of a unique, biological user attribute that may be used to identify a user. Biometric sensor 560 may include a fingerprint sensor such as an optical sensor or a capacitance sensor. Alternatively, biometric sensor 560 may include a microphone, a sound recording device, a digital camera, a voice recognition system, a retinal pattern scanner, a signature verification system, an iris-scanning module, etc. In this description, biometric sensor 560 includes not only the physical sensor that receives the raw biometric data, but also the arrangement of sensors, logic, algorithms and the like that collectively sense, measure, evaluate and generate a data signal or signals representative of the user's biometric signature. The biometric signature data from biometric sensor 560 may be compared with a profile of user 120 stored in memory device 530 to authenticate that user 120 is using personal network 100.

In one embodiment, wearable device 110B may also include one or more accelerometers to detect the orientation and inertia of wearable device 110. In one embodiment, biometric sensor 560 may be a microelectro-mechanical systems (MEMS) accelerometer configured to detect a breathing pattern of the user. Additional detailed information on this embodiment are described in U.S. application Ser. No. 16/001,930, filed Jun. 6, 2018, which issued as U.S. Pat. No. 10,284,552 on May 7, 2019, and which is incorporated herein by reference.

Consistent with the present disclosure, wearable device 110C may include a long-range transceiver 570. A long-range transceiver is a device similar to the short-range transceiver but having a transmission range greater by at least two times from the short-range transceiver, at least four times from the short-range transceiver, or at least ten times from the short-range transceiver. Long-range transceiver 570 may use any known standard to transmit and/or receive data in a transmission range greater than 10 meters. For example, long-range transceiver 570 may use one or more of the following exemplary communication standards: GSM, GPRS, HSPA, Edge, LTE, LTE Advanced, HSPA, CDMA, CDMA Rev A, CDMA Rev B, WiMAX, WiFi, Bluetooth, COFDM, Wibro, Satellite BGAN, and satellite VSAT. Consistent with the present disclosure, long-range transceiver 570 may be configured to communicate with different components of system 200 using public network 220.

Figure 6:
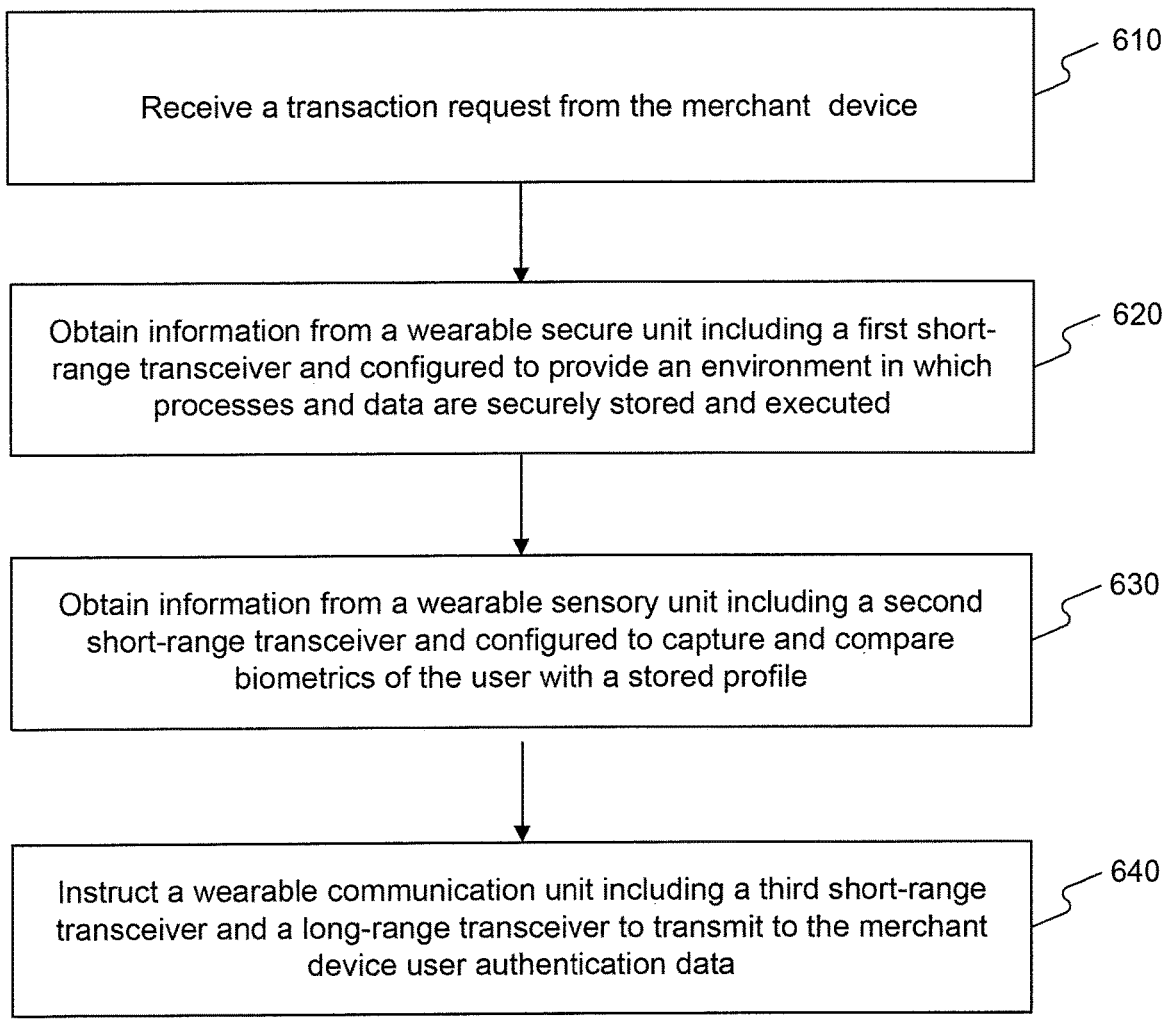
FIG. 6 is a flowchart of an exemplary process for supporting secure payment by a user, consistent with disclosed embodiments.

Reference is now made to FIG. 6, which depicts an exemplary method 600 for using a network of wearable devices to support secure payment for a user consistent with the present disclosure. In one embodiment, all of the steps of method 600 may be performed by at least one processor located in the wearable communication unit. In the following description, reference is made to certain components of system 200 for purposes of illustration. It will be appreciated, however, that other implementations are possible and that other components may be utilized to implement the exemplary method. It will be readily appreciated that the illustrated method can be altered to modify the order of steps, delete steps, or further include additional steps.

At step 610, a processing device (e.g., processor 520 located at wearable device 110C) may receive a transaction request from merchant device 240. In one embodiment, the transaction request may include a request for a token associated with user 120. The purpose of the transaction request may be to validate that the user that is initiating the transaction is the same as the user associated with the same financial account of user 120 that corresponds to the requested token. At step 620, the processing device may obtain information from a wearable secure unit (e.g., wearable device 110A) including a first short-range transceiver 540 and configured to provide an environment in which processes and data are securely stored and executed. Consistent with the present disclosure, the obtained information may be an identified token stored in an active slot of secure element 280. At step 630, the processing device may obtain information from a wearable sensory unit (e.g., wearable device 110B) including a second short-range transceiver 540 and configured to capture and compare biometrics of the user with a stored profile. Consistent with the present disclosure, the obtained information may be an indication if the biometric signature of user 120 that uses wearable device 110B matches the profile stored in memory device 530. Based on the obtained information, the processing device may, at step 640, instruct a wearable communication unit (e.g., wearable device 110C) to transmit user authentication data to merchant device 240. In one example, the user authentication data may include the identified token from the wearable secure unit.

Figure 7:
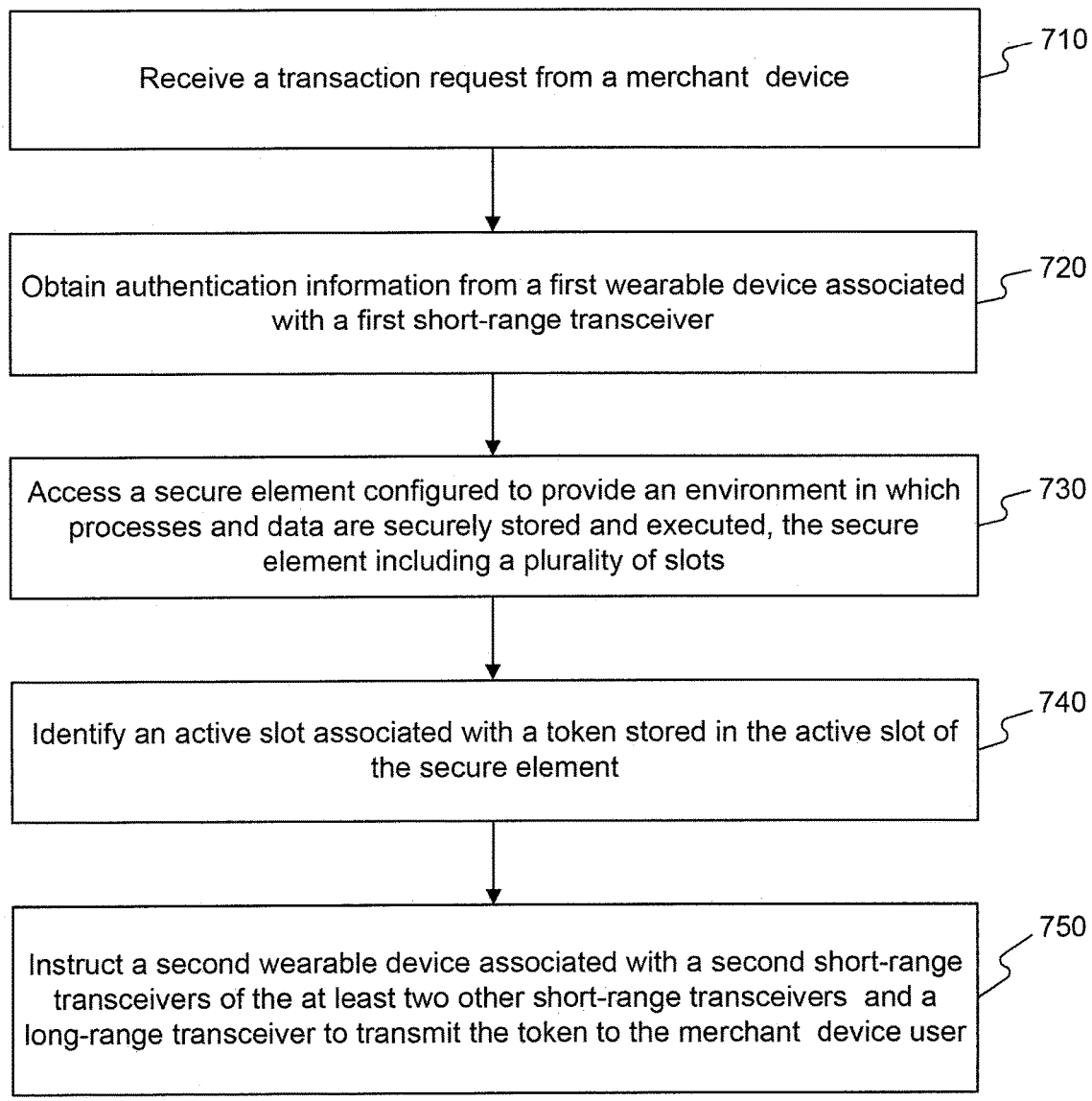
FIG. 7 is a flowchart of another exemplary process for supporting secure payment by a user, consistent with disclosed embodiments.

Reference is now made to FIG. 7, which depicts an exemplary method 700 for using a wearable device to support secure payment for a user consistent with the present disclosure. In one embodiment, all of the steps of method 700 may be performed by at least one processor is located in the wearable secure unit. In the following description, reference is also made to certain components of system 200 for purposes of illustration. It will be appreciated, however, that other implementations are possible and that other components may be utilized to implement the exemplary method. It will be readily appreciated that the illustrated method can be altered to modify the order of steps, delete steps, or further include additional steps.

At step 710, a processing device (e.g., processor 520 located at wearable device 110A) may receive a transaction request from merchant device 240. In one embodiment, the transaction request may be received via a wearable unit other than the wearable unit comprising the processing device. For example, wearable device 110C may communicate directly with merchant device 240 and convey the request to wearable device 110A. At step 720, the processing device may obtain authentication information from a first wearable device (e.g., wearable device 110B) associated with a first short-range transceiver 540. Consistent with the present disclosure, the obtained information may be an indication if the biometric signature of user 120 that uses wearable device 110B matches the profile stored in memory device 530. At step 730, the processing device may access a secure element (e.g., secure element 280) configured to provide an environment in which processes and data are securely stored and executed, the secure element including a plurality of slots. At step 740, the processing device may identify an active slot associated with a token stored in the active slot of the secure element, At step 750, the processing device may instruct a second wearable device (e.g., wearable device 110C) associated with a second short-range transceiver of the at least two other short-range transceivers and a long-range transceiver (e.g., long-range transceiver 570) to transmit the token to merchant device 240. In one embodiment, the processing device may transmit the token to merchant device 240, using long-range transceiver 570, only upon receiving a confirmation from that the biometric signature of user 120 that uses wearable device 110B matches the profile stored in memory device 530.

In related embodiments, the processing device of one of wearable device 110 may be configured to report when a member of personal network 100 has lost connectivity to indicate that personal network 100 may became compromised. Also, the processing device may be configured to identify the active slot only when the obtained authentication information from the first wearable device confirms the identity of user 120.

Descriptions of the disclosed embodiments are not exhaustive and are not limited to the precise forms or embodiments disclosed. Modifications and adaptations of the embodiments will be apparent from consideration of the specification and practice of the disclosed embodiments. For example, the described implementations include hardware, firmware, and software, but systems and techniques consistent with the present disclosure may be implemented as hardware alone. Additionally, the disclosed embodiments are not limited to the examples discussed herein.

Computer programs based on the written description and methods of this specification are within the skill of a software developer. The various programs or program modules may be created using a variety of programming techniques. For example, program sections or program modules may be designed in or by means of Java, C, C++, assembly language, or any such programming languages. One or more of such software sections or modules may be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps or inserting or deleting steps. It is intended, therefore, that the specification and examples be considered as example only, with the true scope and spirit being indicated by the following claims and their full scope of equivalents.

What is claimed is:

1. A system for facilitating secure payment, comprising:
a first wearable device comprising a secure unit storing a plurality of virtual slots each storing a virtual token associated with a financial account, wherein the plurality of virtual slots are rotated through such that only a first virtual slot of the plurality of virtual slots is active at a time;
a second wearable device; and
a third wearable device comprising a communication unit configured to transmit, to a merchant device, user authentication data and a virtual token stored in the first virtual slot to cause the merchant device to obtain information related to a financial account associated with the virtual token stored in the first virtual slot to facilitate a payment transaction,
wherein the first wearable device, the second wearable device, and the third wearable device form a personal mesh network,
wherein each of the first wearable device, the second wearable device, and the third wearable device comprises a short-range transceiver configured to relay information to one another as part of the personal mesh network,
wherein the third wearable device comprises a long-range transceiver, and
wherein the user authentication data and the virtual token stored in the first virtual slot are transmitted to the merchant device via the long-range transceiver of the third wearable device.

2. The system of claim 1, wherein the long-range transceiver of the third wearable device is configured with a wireless transmission range of at least two times a wireless transmission range of the short-range transceiver of the third wearable device.

3. The system of claim 1, wherein the second wearable device comprises a sensory unit configured to capture and compare biometrics of a user with a stored profile associated with the user, wherein the sensory unit of the second wearable device comprises at least one biometric sensor, wherein the biometrics of the user is compared with the stored profile associated with the user to authenticate the user to access the secure unit of the first wearable device.

4. The system of claim 1, wherein the short-range transceiver of the third wearable device is configured with a wireless transmission range of less than 10 meters.

5. A method implemented by one or more processors executing computer program instructions that, when executed, perform the method, the method comprising:
storing, by a first wearable device, a plurality of virtual slots in a secure unit of the first wearable device, wherein each of the plurality of virtual slots store a virtual token associated with a financial account;

rotating, by the first wearable device, the plurality of virtual slots such that only a first virtual slot of the plurality of virtual slots is active at a time; and transmitting, by a second wearable device, to a merchant device, via a communication unit of the second wearable device, user authentication data and a virtual token stored in the first virtual slot to cause the merchant device to obtain information related to a financial account associated with the virtual token stored in the first virtual slot to facilitate a payment transaction, wherein at least the first wearable device and the second wearable device form a personal mesh network, wherein each of the first wearable device, the second wearable device, and at least one other device of the personal mesh network comprises a short-range transceiver configured to relay information to one another as part of the personal mesh network, wherein the second wearable device comprises a long-range transceiver, and wherein the user authentication data and the virtual token stored in the first virtual slot are transmitted to the merchant device via the long-range transceiver of the second wearable device.

6. The method of claim 5, further comprising:

capturing biometrics of a user using a sensory unit of a third wearable device; and comparing the biometrics of the user with a stored profile associated with the user to authenticate to the payment transaction for the user.

7. The method of claim 6, wherein the sensory unit of the third wearable device comprises a biometric sensor that provides data representing a biological user attribute used for authenticating the payment transaction for the user.

8. The method of claim 5, wherein the long-range transceiver of the second wearable device is configured with a wireless transmission range of at least two times a wireless transmission range of the short-range transceiver of the second wearable device.

9. The method of claim 5, wherein at least one of the first wearable device or the second wearable device comprises a biometric sensor used for authenticating a user.

10. The method of claim 5, wherein the short-range transceiver of the second wearable device is configured with a wireless transmission range of less than 10 meters.

11. The method of claim 5, wherein the virtual token stored in the first virtual slot is associated with at least one financial account of a user of at least one of the first or second wearable device.

12. The method of claim 11, wherein the virtual token stored in each of the plurality of virtual slots each is associated with a different financial account.

13. The method of claim 5, further comprising:

determining, using at least one processor of each of the first wearable device and the second wearable device, when a wearable device of the personal mesh network has lost connectivity to indicate that the personal mesh network is compromised.

14. The method of claim 5, wherein at least one of the first wearable device or the second wearable device comprises an internal power supply.

15. A non-transitory computer-readable medium storing computer program instructions that, when executed by one or more processors, effectuate operations comprising:

receiving a transaction request from a merchant device;

obtaining information from a secure unit of a first wearable device, wherein the secure unit of the first wearable device stores a plurality of virtual slots and each of the plurality of virtual slots stores a virtual token associated with a financial account, and wherein the plurality of virtual slots are rotated through such that only a first virtual slot of the plurality of virtual slots is active at a time;

identifying a virtual token stored in the first virtual slot of the plurality of virtual slots when the transaction request is received; and instructing a communication unit of a second wearable device to transmit, to the merchant device, user authentication data and the virtual token stored in the first virtual slot to cause the merchant device to obtain information related to the financial account associated with the virtual token to facilitate a payment transaction, wherein at least the first wearable device and the second wearable device form a personal mesh network, wherein each of the first wearable device, the second wearable device, and at least one other device of the personal mesh network comprises a short-range transceiver configured to relay information to one another as part of the personal mesh network, wherein the second wearable device comprises a long-range transceiver, and wherein the user authentication data and the virtual token stored in the first virtual slot are transmitted to the merchant device via the long-range transceiver of the second wearable.

16. The non-transitory computer-readable medium of claim 15, wherein the operations further comprise:

obtaining information from a sensory unit of a third wearable device, wherein the sensory unit is configured to capture biometrics of a user and compare the biometrics of the user with a stored profile associated with the user.

17. The non-transitory computer-readable medium of claim 16, wherein the sensory unit of the third wearable device comprises a biometric sensor that provides data representing a biological user attribute used for authenticating the user.

18. The non-transitory computer-readable medium of claim 15, wherein the long-range transceiver of the second wearable device is configured with a wireless transmission range of at least two times a wireless transmission range of the short-range transceiver of the second wearable device.

19. The non-transitory computer-readable medium of claim 15, wherein at least one of the first wearable device or the second wearable device comprises a biometric sensor used for authenticating a user.

20. The non-transitory computer-readable medium of claim 15, wherein the short-range transceiver of the second wearable device is configured with a wireless transmission range of less than 10 meters.

* * * * *